(12) United States Patent
McRae

(10) Patent No.: US 12,033,478 B2
(45) Date of Patent: Jul. 9, 2024

(54) MULTISENSOR SECURITY SYSTEM WITH AIRCRAFT MONITORING

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 70 days.

(21) Appl. No.: 17/829,483

(22) Filed: Jun. 1, 2022

(65) Prior Publication Data

US 2022/0392322 A1 Dec. 8, 2022

Related U.S. Application Data

(60) Provisional application No. 63/195,874, filed on Jun. 2, 2021.

(51) Int. Cl.
*G08B 13/00* (2006.01)
*G08B 3/00* (2006.01)

(52) U.S. Cl.
CPC ............... *G08B 13/00* (2013.01); *G08B 3/00* (2013.01)

(58) Field of Classification Search
CPC ....................................... G08B 13/00
See application file for complete search history.

(56) References Cited

U.S. PATENT DOCUMENTS

2018/0025653 A1* 1/2018 Wang .................. G08G 5/0082
340/961
2022/0238987 A1* 7/2022 Davis .................. H01Q 1/1242

FOREIGN PATENT DOCUMENTS

| CN | 111931657 A | * 11/2020 |
| CN | 111931657 A | 11/2020 |
| JP | 2016153775 A | 8/2016 |
| RU | 2724805 C1 | 6/2020 |

* cited by examiner

*Primary Examiner* — Benyam Haile
(74) *Attorney, Agent, or Firm* — Boyle Fredrickson S.C.

(57) ABSTRACT

In an electronic monitoring system, an array of ground-level sensors and aircraft sensors are integrated to provide comprehensive security and privacy sensing of different types of threats. Information from the ground-level sensors may be used to augment the detection and identification of aircraft such as piloted airplanes or unmanned drones, and a white list system may be used to reduce false positive alerts for routine delivery aircraft and the like.

15 Claims, 2 Drawing Sheets

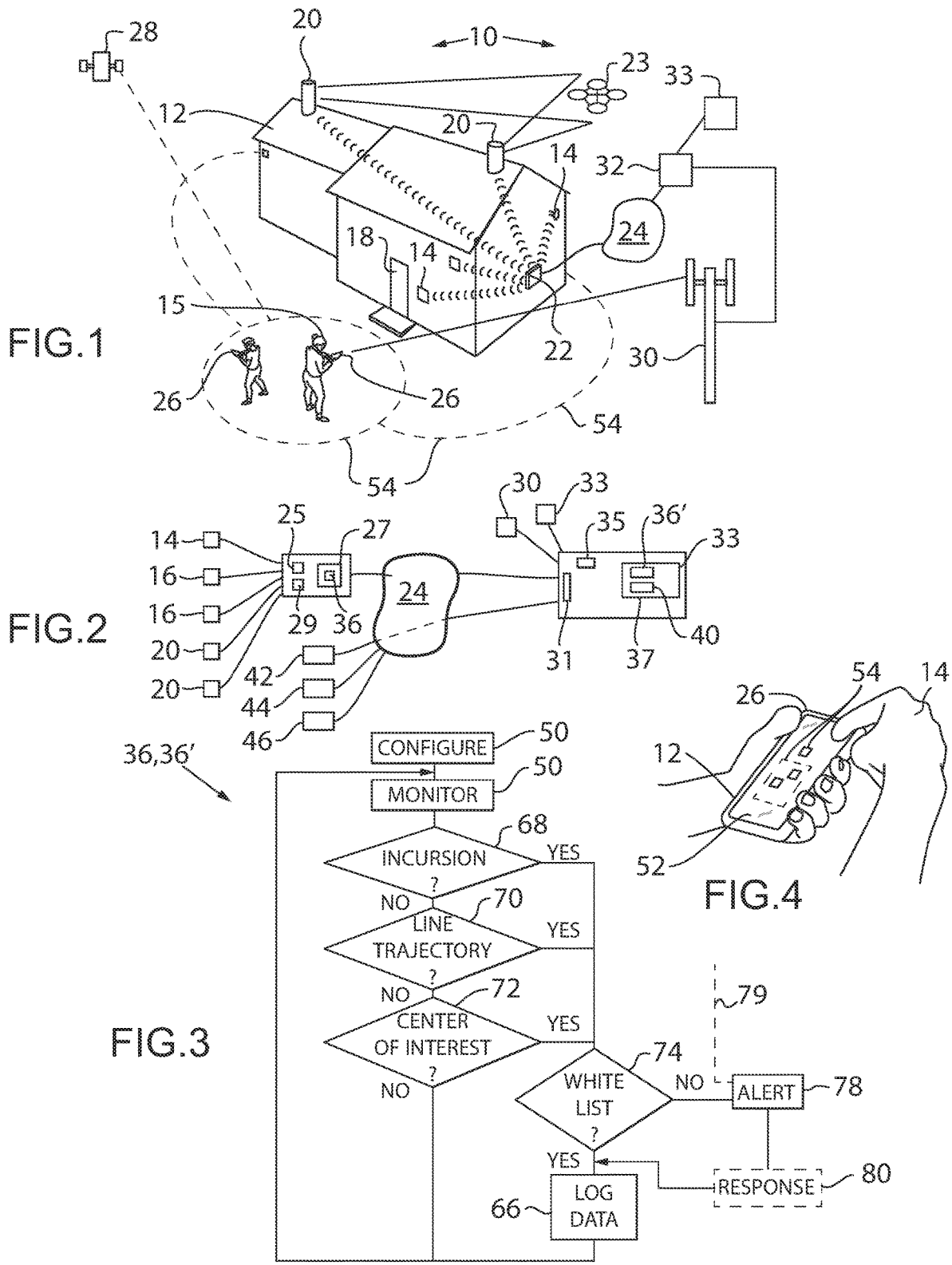

MULTISENSOR SECURITY SYSTEM WITH AIRCRAFT MONITORING

CROSS-REFERENCE TO A RELATED APPLICATION

This application claims the benefit of provisional patent application U.S. App. No. 63/195,874, filed on Jun. 2, 2021 and entitled "Multisensor Security System with Drone Monitoring", the entire contents of which are hereby expressly incorporated by reference into the present application.

BACKGROUND OF THE INVENTION

1. Field of the Invention

The present invention relates to monitoring systems including multiple sensors for providing a multifactor monitoring experience and, in particular, to such a system accounting for incursions threats from aircraft.

2. Discussion of the Related Art

Security systems, often known as "monitoring systems", are known for monitoring an environment, such as a home, to alert the homeowner to security and privacy risks such as trespassers or intruders. Early security systems monitored only points of ingress, such as windows and doors, with switches or vibration sensors. More recently, sophisticated systems have employed cameras with and without motion detection and microphones, sometimes coupled with other electronic sensors such as separate motion detectors or IR detectors, to provide a user with a more comprehensive security experience capturing information and recording events both within and outside of the home.

These sensing devices have also been connected to computers with network access to allow a user to remotely monitor a monitored zone with a user-operated monitoring device, such as a desktop or laptop computer, a smart phone or tablet computer. In these systems, real-time or live monitoring of events is possible with the benefit of high-speed network connections.

Existing known security systems implicitly contemplate only ground-level security threats, for example, from individuals approaching the home by foot or vehicle, and in this respect failed to account for the emerging privacy and safety threat of air-based security threats, most notably piloted aircraft and, even more typically, drone aircraft. The need therefore has arisen to monitor for and react to such threats.

SUMMARY OF THE INVENTION

In one aspect, this need is met through operation of a system for real-time monitoring that may include one or more sensors identifying the presence of ground-level security threats external to a monitored stationary structure and at least one aircraft sensor identifying the presence of aircraft external to the monitored stationary structure. An integrated controller receiving data from the ground-level sensor and an aircraft sensor provides an automated report to a user of security threats or other events of interest conditioned on the received data.

It is a feature of at least one embodiment of the invention to provide an integrated privacy and security solution against ground-based and airborne threats.

The integrated controller may process data from the aircraft sensor to provide the automated report based on a sensed aircraft within a predetermined perimeter around the monitored stationary zone as defined by the user. Alternatively, or in addition, the automated report may be triggered based on a sensing of a drone or other aircraft having a predetermined trajectory.

It is thus a feature of at least one embodiment of the invention to provide both an indication of aircraft intrusions and advanced warning of aircraft intrusions from trajectory monitoring.

The perimeter further includes a perimeter around at least one user outside of the monitored stationary zone.

It is thus a feature of at least one embodiment of the invention to expand the idea of perimeter monitoring to moving individuals who might be subject to unexpected privacy invasion by an airborne security threat.

The integrated controller may have a white list listing known drones and/or other aircraft associated with a low security threat, and the integrated controller may provide the report only when a sensed aircraft cannot be found on the white list.

It is thus a feature of at least one embodiment of the invention to minimize false positive report generation as benign aircraft traffic increases.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings in which like reference numerals represent like parts throughout, and in which:

FIG. 1 is a perspective representation of an example security environment having a protected zone with users and showing multiple sensors and an integrated security controller in one embodiment;

FIG. 2 is a block diagram showing the interconnection of the sensors and other components with the security controller of FIG. 1;

FIG. 3 is a flow diagram showing a program executable by the invention to implement integrated security control using the components of FIGS. 1 and 2;

FIG. 4 is a perspective representation of user interaction to define a protected perimeter on a mobile device per the flow diagram of FIG. 3;

DETAILED DESCRIPTION OF THE PREFERRED EMBODIMENTS

Figure 5:
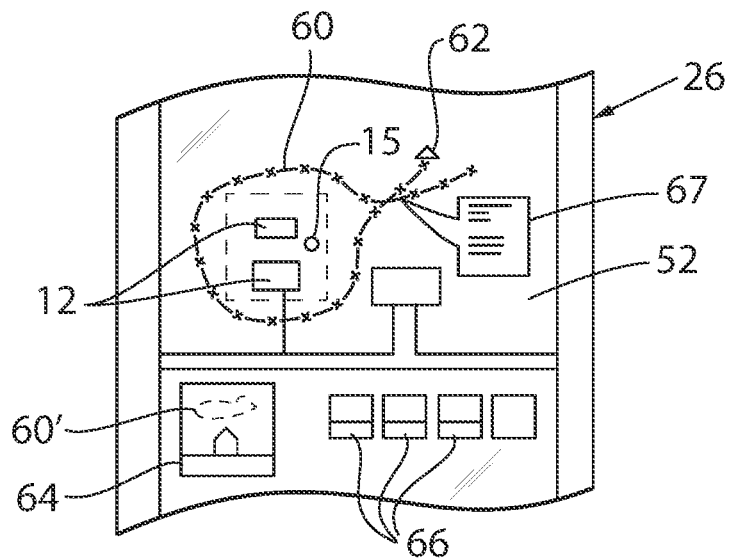
FIG. 5 is a fragmentary detail of a report delivered to the user on the mobile device of FIG. 4 according to the flow diagram of FIG. 3.

Referring now to FIG. 1, in accordance with an aspect of the invention, a system for real-time monitoring 10 may provide privacy and security monitoring both with respect to a fixed stationary protected zone 12 and/or a protected zone of particular individuals 15. The zone 12 may be a building or other structure or a tract of land, such as a parking lot or yard. It may be three dimensional, covering a surface area and extending a height above the surface. The zone 12 may be associated with multiple ground-level sensors, for example, cameras, 14 with or without microphones and dedicated motion detectors 16 and the like. These ground-level sensors may be mounted on the structure at various locations both inside a building for monitoring interior spaces and, for example, at locations directed to the zone 12 outside and around a building, for example, near a door 18 to monitor package delivery and the like. In one aspect, the ground-level sensors could be Arlo cameras as part of an Arlo Smart Security System as available from Arlo Technologies, Inc. of Carlsbad, California.

The zone 12 may also be associated with one or more aircraft sensors s positioned and adapted, however, for monitoring regions above the ground, for example, that may be in the flight path of an aircraft. The aircraft of greatest interest to most users is a drone, an example of which is illustrated at 23. These cameras and/or arrays of such cameras may detect drone images, silhouettes, or specular reflections or changes in sky illumination associated with the presence of a drone. The cameras may have both imaging and motion detecting capability, the latter by comparing successive frames of camera-obtained images.

The drone sensors 20 may alternatively, or in addition, incorporate radar sensors sensing reflected radar signals or passive RF receiver antennas that can receive radiofrequency emissions characteristic of drones 23, for example, from a drone-contained camera relaying video data. In some cases, the sensors may be arrays of sensors such as antenna arrays, for example, using phased array techniques and may be separate, single, or pairs of sensors spaced apart for triangulation or trilateration providing angular location and range information. Range information may also be deduced by signal strength, radar, echo times, optical image size, and the like. Desirably, the drone sensors 20 alone or as an ensemble can provide monitoring over at least 180 degrees of azimuth and elevation with respect to a horizontal plane.

When passive sensing is used, the drone sensors 20 may employ passive radio detection, for example, monitoring the common bands of drone communications at 2.4 GHz and 5.8 GHz as well as other bands like 1.2 GHz, 1.3 GHz, and the like. The drone sensors 20 in this case may listen for the characteristic signals and reference a database or employ machine learning to identify whether the signal comes from a drone and possibly information about the drone identity.

Referring also to FIG. 2, the ground-level sensors 14 and 16 and drone sensors 20 may conveniently communicate wirelessly, for example, using the Wi-Fi standard 802.11 or the like with a local network manager 22 implementing a local area network and other functionality as will be described. Generally, the local network manager 22 will incorporate computer functionality including one or more computer processors 25 and memory 27 holding a stored program 36 for execution by the processors 25. The local network manager 22 may also include radiofrequency circuits 33 for implementing the wireless communication described above. In one aspect, the local network manager 22 could be an Arlo base station, as part of an Arlo Smart Security System as available from Arlo Technologies, Inc. Alternatively, the local network manager 22 can be built into another device, such as a gateway router, or even (at least in part) in one of the sensors, for example a camera 14.

In all cases, the local network manager 22 may, in turn, communicate with the Internet 24 or other similar communication network by means of a standard cable connection or functionally similar communication channel.

In one embodiment, it is contemplated that one or more of the individuals 15 will have a portable electronic device such as a cell phone 26 which may receive signals from a GPS service 28 to provide the cell phone 26 with location information and may communicate with a cellular network 30 for bidirectional communication with the central security supervisor 32.

Generally, the central security supervisor 32 also communicates with the Internet 24 and with the cell phone systems 30 through interface circuitry 31 and may provide computer functionality including one or more processors 35 and computer memory 37 for executing and holding, respectively, a stored program 36'. The local network manager 22 and central security supervisor 32 will, individually or in combination, implement an integrated security controller through programs 36 and/or 36' executed on these devices and as will be described in more detail below. The memory 37 may also hold multiple data files 40 including, for example, a white list, and data log files as will be discussed below.

The central security supervisor 32 may have access, for example, through the Internet 24 with various information services including package delivery servers 42 providing drone package delivery schedules indexing package delivery occurrences to particular locations and times. The central security supervisor 32 may also access expected government servers 44, for example, providing a central database for registering drone flights, and may also access information servers from weather services 46 and the like providing local weather and sky conditions. The central security supervisor 32 will also provide for communication by any of the Internet 24 or cell phone system 30 or telephone network (POTS) with other individuals 29 (for example, the parent or guardian of a child, trusted friends, or local authorities or security personnel different from the individuals 15).

Referring now also to FIG. 3, the programs 36 and 36' (henceforth collectively referred to as programs 36) may provide a user interface on the cell phone 26 or on any mobile or stationary computer capable of connecting through the Internet 24 or wireless channel. This user interface may be a locally run application or may be implemented through a browser by a user interface served by the central security supervisor 32. The interface may allow configuration of the integrated security system as indicated by process block 50 providing configuration of the various features of the security system as will be discussed below. This configuration process may define locations and names of the various sensors 14, 16 and 20, provide contact information for other individuals to be notified of alerts, provide a local telephone number or text number for the individual's cell phone 26, and may authorize the relaying of GPS coordinates of the cell phone 26 to the central security supervisor 32 to be used in establishing a mobile perimeter around the individuals 15 as will be discussed.

The individual 15 may identify a security perimeter 54 that will be used to generate push warnings and security notifications to the individuals 15. In one embodiment and referring also to FIG. 4, the user may be presented with an aerial satellite photo of their immediate location when standing near the stationary zone 12 and may trace on a touchscreen 52 of the cell phone 26 an outline of the zone 12 which will be used as a reference for subsequent security alerts by defining one or more security perimeters 54.

Importantly, this outline provides absolute (GPS based) location information as opposed to the relative locations of the various sensors 20, 14, and 16, which may also be indicated at this time graphically superimposed on the satellite photo. Generally, all of the functions implemented by the cell phone 26 may also be implemented on other devices such as desktop computers with location information being supplied, for example, manually by the individual.

Once a security perimeter 54 is defined and the system otherwise configured, a monitoring indicated by process block 51 begins in which normal security operation is provided by the ground-level sensors 14 as far as monitoring local ground level motion and providing on demand or push images and the like based on user preferences, for example, at times triggered by motion sensing or on demand. The drone sensors 20 further are activated to detect drones 23.

Referring also to FIG. 5, during the monitoring 51, the location of any detected drones 23 may be displayed automatically on detection, and/or on demand, on the cell phone 26 or other monitoring device or in a push notification or other automatically-generated and displayed notification or alert in a plan map view on the display 52 showing the stationary zone 12 and/or the individual 15 and a recent trajectory 60 of the drone 23 over a span of a predetermined time with respect to either of these reference points of the stationary zone 12 or the individual 15. For example, the last five minutes and a current location 62 of the drone 23 may be displayed. Multiple drones 23 may be displayed at this time with different symbols or colors and their trajectories 60. Each trajectory 60 may be labeled with any available or derived drone identification information 67 as will be discussed further below. An inset display 64 may provide for altitude information for the displayed trajectories 60', for example, over a symbolic representation of the zone 12 and individual 15. In addition, the display may provide thumbnail images 61 from any of the ground-based sensors and any of the drone sensors 20 having camera capabilities. These thumbnail images 61 may be selected by the individual for closer inspection providing a larger image with current monitoring data in the form of still images or streaming video and/or microphone data.

Referring again to FIG. 3, importantly, the system can provide push notifications to the individual of impending security threats. These notifications may be triggered by an incursion of a detected drone 23 into the perimeter 54 per decision block 68 thus acting in the manner of a conventional perimeter alarm system but with respect to aerial threats. Alternatively, or in addition at subsequent process block 70, the system may make use of the current trajectory 60 to extrapolate an imminent incursion through the perimeter 54 within a predetermined time, for example, 30 seconds as may be set by the user. In one case, this extrapolation will be a linear extrapolation from a most recent drone location and a shortly proceeding drone location of, for example, one second earlier.

The invention contemplates that more sophisticated trajectories may be analyzed, for example, at decision block 72, a circling of the drone around the stationary zone 12 or individual 15 outside of the perimeter of that zone, such as may represent a privacy breach, is detected. Each of these push notifications of decision blocks 68, 70, and 72 may be individually selected (or disabled) and modified by the user with respect to sensitivity timing, etc. When a trigger event occurs, the program 36 may proceed to decision block 74 to determine whether the drone is on "white list" of known benign drones obtained, for example, from package delivery servers 42 or government services 44 (shown in FIG. 2). When there is identifying information about the detected drone, as will be discussed below, this identifying information may be used to index the white list. Alternatively, the time of the incursion may be compared to scheduled times for drones on the white list. If the white list determines that the drone is benign (on the white list) information about the drone 23, including the trajectory, identification time, and an image, are logged for later access and review at block 76, and the program 36 returns to monitoring.

If at decision block 74, the identified drone 23 is not on the white list, the program may proceed to process block 78 providing a general alert function which may include a tone or vibration on the user's cell phone 26 or other monitoring device or a separate alarm bell or tone generator triggered by the local network manager 22 and notifications to third parties 29. Optionally, as indicated by process block 80, limited responses to the drones 23 may be implemented, for example, signal jamming as permitted by law, the use of camera-blinding lights, reduction of outside illumination at night, etc. In all cases the program 36 proceeds back to process block 66 and the incident is logged, for example to record drone brand, drone identification number, drone location, drone altitude, drone sensing time and any other identifying information. The alert function may be activated alternatively through standard monitoring of the ground-level sensors per path 79 when only a ground-level threat is detected.

Figure 6:
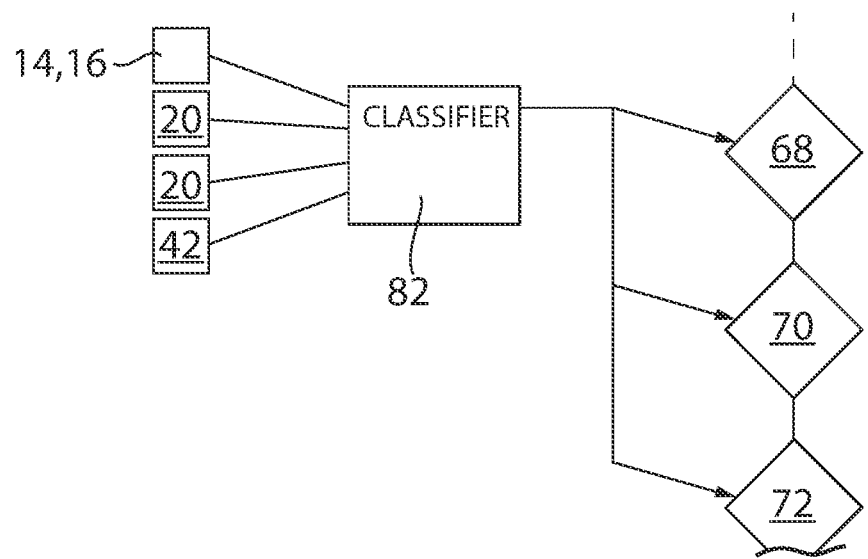
FIG. 6 is a block diagram of a machine learning system that may be used to implement a classifier based on the sensors of FIG. 1.

Referring now to FIG. 6, the present invention contemplates that process blocks 68, 70 and 72 will provide accurate identification of a drone 23, as such, through the use of a classifier 82. The classifier 82 may take a variety of inputs including inputs from ground-level sensors 14, 16 and drone sensors 20 working in tandem as well as other available information sources. In some cases, the ground-level sensors will provide important data about local lighting conditions and weather, and may provide evidence of low altitude drone flights that can be correlated with the drone sensors 20. Importantly, the ability to use multiple inputs to identify the drone 23 allows more sensitive drone identification by reducing false positives from birds, radiofrequency noise, and sensor limitations.

In one embodiment the classifier 82 may be a machine learning system trained with multiple sensor data described above in various test sets as is understood in the art. Ideally several types of drone sensors 20 may be employed, including camera-based systems, radar systems, and RF detection systems. Local weather and lighting conditions, for example, rain, which may affect radar, daylight, or cloudiness, and angle of the sun, which may influence optical detection systems, may be accounted for in the training set given to the supervised machine learning system. Instead of or in addition to being obtained from the ground-level sensors, weather data may be obtained from other sources such as local weather monitoring stations, local clocks, and ephemeris data. The training sets may allow the introduction of factors, for example, doppler shift in the radar caused by propeller action or audio signals from propeller sound, to be incorporated into the detection process. The classifier 82, for example, may identify the drone make and model and/or a drone identification number.

The invention further contemplates that ongoing and evolving standards for drone regulation will provide for an IFF type signal from drones that may be used for this purpose. Importantly the classifier 82 may also deduce range information, for example, by acoustic signature strength, optical size estimations, radar information, and the like providing more robust indications of the presence of a drone and identification of that drone.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

It should be emphasized that the drone sensors may be configured to detect and monitor not just drones, but also piloted aircraft and other aircraft, such as piloted aircraft and balloons. Except when discussing features and characteristics unique to true drones, the term "drone" as used herein is intended to encompass all such aircrafts.

What is claimed is:

1. A system for real-time monitoring, comprising:
   at least one sensor identifying a presence of ground-level objects of interest with respect to a monitored zone;
   at least one aircraft sensor identifying a presence of aircraft with respect to the monitored zone; and
   an integrated controller receiving data from the sensor and the at least one aircraft sensor to provide an automated report to a user of activities in the monitored zone conditioned on the received data;
   wherein the integrated controller processes the at least one aircraft sensor to provide the automated report based on a sensed aircraft within a predetermined perimeter around a monitored structure within the monitored zone as defined by the user;
   wherein the automated report is triggered based on a sensing of an aircraft having a predetermined trajectory;
   wherein the predetermined trajectory is an orbiting motion of the aircraft about the structure.

2. The system for real-time monitoring of claim 1, wherein the perimeter further includes a perimeter around at least one user outside of the monitored structure.

3. The system for real-time monitoring of claim 1, wherein the report provides a map indicating aircraft position.

4. The system for real-time monitoring of claim 1, wherein the report provides identifying information about the aircraft including at least one of aircraft brand, aircraft identification number, aircraft altitude, aircraft location, and aircraft sensing time.

5. The system for real-time monitoring of claim 1, wherein the report provides an audible signal to a user-operated monitoring device related to the detection of one or more aircrafts.

6. The system for real-time monitoring of claim 1, further including data logging of the sensor-derived data at the time of report generation.

7. The system for real-time monitoring of claim 1, wherein the integrated controller includes a white list listing known aircraft associated with a low security threat, and wherein the integrated controller provides the report only when a sensed aircraft cannot be found on the white list.

8. The system for real-time monitoring of claim 7, wherein the white list includes at least one of an aircraft identity and an aircraft scheduled time.

9. The system for real-time monitoring of claim 1, wherein the aircraft sensor includes at least one of an optical sensor, a radar-based sensor, an audio sensor, and a radiofrequency signal sensor.

10. The system for real-time monitoring of claim 1, wherein the integrated controller provides the automated report to at least two designated individuals on a push basis.

11. The system of claim 1, wherein the aircraft is a drone.

12. A method for real-time monitoring, comprising:
    (a) collecting data from at least one sensor array that is attached to a monitored stationary structure and, using the collected data, identifying a presence of ground-level objects with respect to a monitored stationary zone;
    (b) collecting data from at least one aircraft sensor that is attached to a stationary structure and, using the data collected from the aircraft sensor, identifying a presence of aircraft with respect to the monitored stationary zone; and
    (c) based on the data from the sensor array and the at least one aircraft sensor, providing an automated report to a user conditioned on the received data;
    wherein the report is triggered by a sensing of an aircraft within a predetermined perimeter around a monitored stationary structure within the monitored zone as defined by the user; and
    wherein the report is triggered based on a sensing of an aircraft having a predetermined trajectory; and
    wherein the predetermined trajectory is an orbiting motion of the aircraft about the structure.

13. The method for real time monitoring of claim 12, wherein the perimeter further includes a perimeter around at least one user outside of the monitored stationary structure.

14. The method for real time monitoring of claim 12, wherein the report is generated only when a sensed aircraft cannot be found on a white list listing known aircraft associated with a low security threat.

15. The method for real time monitoring of claim 12, wherein the aircraft is a drone.

* * * * *